US011398718B2

(12) United States Patent
Mruczek et al.

(10) Patent No.: US 11,398,718 B2
(45) Date of Patent: Jul. 26, 2022

(54) APPARATUS FOR ELECTRICALLY INTERCONNECTING TWO LAMINATED MULTI-PHASE BUSBARS AND SWITCHGEAR CABINET INCLUDING SUCH AN APPARATUS

(71) Applicant: ABB Schweiz AG, Baden (CH)

(72) Inventors: Maciej Mruczek, Cracow (PL); Dariusz Maciocha, Cracow (PL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/070,928

(22) Filed: Oct. 15, 2020

(65) Prior Publication Data

US 2021/0028607 A1 Jan. 28, 2021

Related U.S. Application Data

(63) Continuation of application No. PCT/EP2018/059642, filed on Apr. 16, 2018.

(51) Int. Cl.
*H02B 13/00* (2006.01)
*H02G 5/00* (2006.01)

(52) U.S. Cl.
CPC .......... *H02B 13/005* (2013.01); *H02G 5/005* (2013.01); *H02G 5/007* (2013.01)

(58) Field of Classification Search
None
See application file for complete search history.

(56) References Cited

U.S. PATENT DOCUMENTS 2,097,324 A * 10/1937 Hill ...................... H02B 13/005
439/785
3,365,537 A 1/1968 Fehr, Jr. et al.
(Continued)

FOREIGN PATENT DOCUMENTS

CN 104752963 A * 7/2015
DE 4312617 A1 * 10/1994 ........... H02B 13/005
(Continued)

*Primary Examiner* — Timothy J. Dole
*Assistant Examiner* — Muhammed Azam
(74) *Attorney, Agent, or Firm* — Leydig, Voit & Mayer, Ltd.

(57) ABSTRACT

An apparatus for electrically connecting a first laminated multi-phase busbar to a second laminated multi-phase busbar, each of the first and second laminated multi-phase busbars including a plurality of conducting layers and insulating layers which are arranged between the conducting layers and the conducting layers of the first laminated multi-phase busbar projecting from the insulating layers thereof, forming a first lateral connecting portion with first contact surfaces, and the conducting layers of the second laminated multi-phase busbar projecting from the insulating layers thereof, forming a second lateral connecting portion with second contact surfaces, the apparatus including: a bridging element which includes a plurality of laminated insulating layers and conducting layers having contact surfaces for contacting associated contact surfaces of the first and second lateral connecting portions of the first and second busbar; a first clamping arrangement having clamping plates for mechanically contacting and urging associated opposing first outer clamping sections.

9 Claims, 5 Drawing Sheets

(56) References Cited

U.S. PATENT DOCUMENTS

| | | | | |
|---|---|---|---|---|
| 3,614,297 A * | 10/1971 | Carlson | ............... | H02G 9/065 |
| | | | | 174/70 B |
| 3,882,265 A | 5/1975 | Johnston et al. | | |
| 4,097,103 A * | 6/1978 | Krause | ................ | H02G 5/007 |
| | | | | 174/88 B |
| 5,760,339 A * | 6/1998 | Faulkner | ............... | H02G 5/007 |
| | | | | 174/88 B |
| 5,821,464 A * | 10/1998 | Graham | ................ | H02G 5/06 |
| | | | | 174/88 B |
| 6,305,991 B1 | 10/2001 | Gerster | | |
| 2003/0067756 A1* | 4/2003 | Popa | .................... | H05K 3/202 |
| | | | | 361/775 |
| 2016/0156169 A1* | 6/2016 | Jaena | .................. | H02G 5/007 |
| | | | | 439/213 |
| 2017/0229379 A1* | 8/2017 | Hayase | ................ | H02G 5/005 |
| 2019/0120890 A1* | 4/2019 | Patel | ..................... | G01K 1/14 |
| 2021/0027966 A1* | 1/2021 | Kraft | ...................... | H02B 1/20 |
| 2021/0036498 A1* | 2/2021 | Kraft | ...................... | H02B 1/013 |

FOREIGN PATENT DOCUMENTS

| | | | | |
|---|---|---|---|---|
| DE | 69930824 T2 * | 11/2006 | ............ | H02G 5/005 |
| DE | 102008056482 A1 | 5/2010 | | |
| DE | 102005015945 B4 | 7/2015 | | |
| EP | 1014494 A1 | 6/2000 | | |
| EP | 1928066 A2 * | 6/2008 | ............ | H02G 5/007 |
| EP | 2107659 A1 * | 10/2009 | ............ | H02G 5/005 |
| EP | 3038221 A1 * | 6/2016 | ............... | H02G 5/06 |
| EP | 3200299 A1 * | 8/2017 | ............... | H02G 5/06 |
| EP | 3252896 A1 * | 12/2017 | ............ | H02G 5/007 |
| EP | 3863139 A1 * | 8/2021 | ............ | H02G 5/005 |
| FR | 2919764 A1 * | 2/2009 | ........... | H02B 13/005 |
| GB | 2298969 A * | 9/1996 | ............ | H02G 5/007 |
| GB | 2550254 A * | 11/2017 | ............ | H02G 5/007 |
| JP | 2000278826 A * | 10/2000 | ........... | H02B 13/005 |
| KR | 200423587 Y1 * | 8/2006 | | |
| KR | 100759524 B1 * | 9/2007 | | |
| KR | 20090014901 A * | 2/2009 | ........... | H02B 13/005 |
| KR | 101816758 B1 * | 1/2018 | ............... | H02G 5/10 |
| WO | WO-9941815 A2 * | 8/1999 | ............ | H02G 5/007 |
| WO | WO-2008130353 A1 * | 10/2008 | ............... | H02B 3/00 |
| WO | WO-2010054962 A2 * | 5/2010 | ............ | H02G 5/007 |
| WO | WO 2011067647 A2 | 6/2011 | | |
| WO | WO 2013166562 A1 | 11/2013 | | |
| WO | WO-2014173428 A1 * | 10/2014 | ............ | H02B 1/308 |
| WO | WO-2015069264 A1 * | 5/2015 | ............... | H01R 4/44 |
| WO | WO-2016079655 A1 * | 5/2016 | ............ | H02G 5/007 |
| WO | WO-2019201419 A1 * | 10/2019 | ........... | H02B 13/005 |
| WO | WO-2020083498 A1 * | 4/2020 | ........... | H02B 13/005 |

* cited by examiner

APPARATUS FOR ELECTRICALLY INTERCONNECTING TWO LAMINATED MULTI-PHASE BUSBARS AND SWITCHGEAR CABINET INCLUDING SUCH AN APPARATUS

CROSS-REFERENCE TO PRIOR APPLICATION

This application is a continuation of International Patent Application No. PCT/EP2018/059642, filed on Apr. 16, 2018, the entire disclosure of which is hereby incorporated by reference herein.

FIELD

The invention is related to an apparatus for electrically interconnecting two laminated multi-phase busbars and a switchgear cabinet including such an apparatus.

BACKGROUND

Multi-phase busbars are used for example in low voltage switchgears to conduct and distribute alternating electrical current to different electrical devices which are installed in switch gear cabinets. In order to conduct all three or even more phases of an alternating current in a single busbar, laminated multi-phase busbars have been developed which comprise a base layer and a cover layer of electrically insulating material between which two or more layers of conducting sheet metal, in particular copper sheets, are arranged which are electrically insulated from each other by means of insulating layers.

An afore-described busbar in which the different layers are laminated to each other by means of liquid resin is described in DE 10 2005 015 945 B4 of the applicant. The described laminated multi-phase busbar has the advantage that it has a compact design and does not tend to delaminate due to repellant forces which are generated by the alternating electric currents which are conducted in the different conducting layers for each phase and which in case of a short circuit can be in the range of several thousand ampere (kA).

In order to supply electric energy from a power source to a laminated multi-phase busbar, it is known to remove the insulating material in a lateral section of the sandwich of layers and expand the uncoated conducting layers which project from the insulating layers, so as to provide for four lateral connecting portions, that is one for each phase and one for protective earth, to which the terminals of the electric power source can be connected. The conducting layers and the contact sections provided thereat, are preferably made of copper or aluminium and may have a thickness in the range between 0.5 and 5.0 mm or more.

The lateral connecting portions are also used to provide an electrical connection between different busbars in two or more switch gear cabinets which are arranged in a row, in order to efficiently feed the electric energy from a power source to the busbars of a plurality of interconnected switchgear cabinets. Moreover, the lateral connecting portions serve to reduce the lengths of laminated busbars, as long busbars for large switchgear cabinets can be spilt up into a plurality of shorter busbar sections which are joined at the customer site, in order to ease handling and reduce transportation costs.

The electrical connection of the conducting layers of one busbar or busbar section to the conducting layers of an adjoining busbar or bus bar section at the lateral connecting portions is usually done by means of a bridging element which has substantially the same laminated sandwich structure as the busbars and which is mounted in a free space provided between the connecting portions of two neighboring busbars.

One problem which arises when using an electrical bridging elements for connecting the lateral connecting portions of two adjoining laminated multi-phase busbars which are also referred to as shipping splits, can be seen in that when connecting the shipping splits of the busbars and bridging element by means of a bolt element which directly extends through a hole in the different laminated layers, a high local pressure is exerted to the outer surface layers of insulating material which cover and sandwich the different conducting layers. These high local pressure is likely to mechanically damage the insulating material, thereby creating cracks in the insulating material which allow ambient air to penetrate into the sandwich of layers. Thus, no gas-tight clamping can be obtained which in turn reduces the long-term stability of the electrical connection.

SUMMARY

In an embodiment, the present invention provides an apparatus for electrically connecting a first laminated multi-phase busbar to a second laminated multi-phase busbar, each of the first and second laminated multi-phase busbars including a plurality of conducting layers and insulating layers which are arranged between the conducting layers and the conducting layers of the first laminated multi-phase busbar projecting from the insulating layers thereof, forming a first lateral connecting portion with first contact surfaces, and the conducting layers of the second laminated multi-phase busbar projecting from the insulating layers thereof, forming a second lateral connecting portion with second contact surfaces, the apparatus comprising: a bridging element which includes a plurality of laminated insulating layers and conducting layers having contact surfaces which are configured to contact associated contact surfaces of the first and second lateral connecting portions of the first and second busbar; a first clamping arrangement comprising clamping plates which are configured to mechanically contact and urge associated opposing first outer clamping sections of the first busbar and the bridging element towards each other; and a second clamping arrangement comprising clamping plates which are configured to mechanically contact and urge associated opposing second outer sections of the second busbar and the bridging element towards each other.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an apparatus for interconnecting the lateral connecting portions of a first and a second adjoining laminated multiphase busbar which allows for an improved long-term stability of the mechanical and electrical connection.

In an embodiment, the present invention provides a switch gear cabinet with a first busbar, a second busbar and a connecting apparatus which overcomes the afore-described problems. This object is achieved by a switchgear cabinet as described herein.

Figure 1:
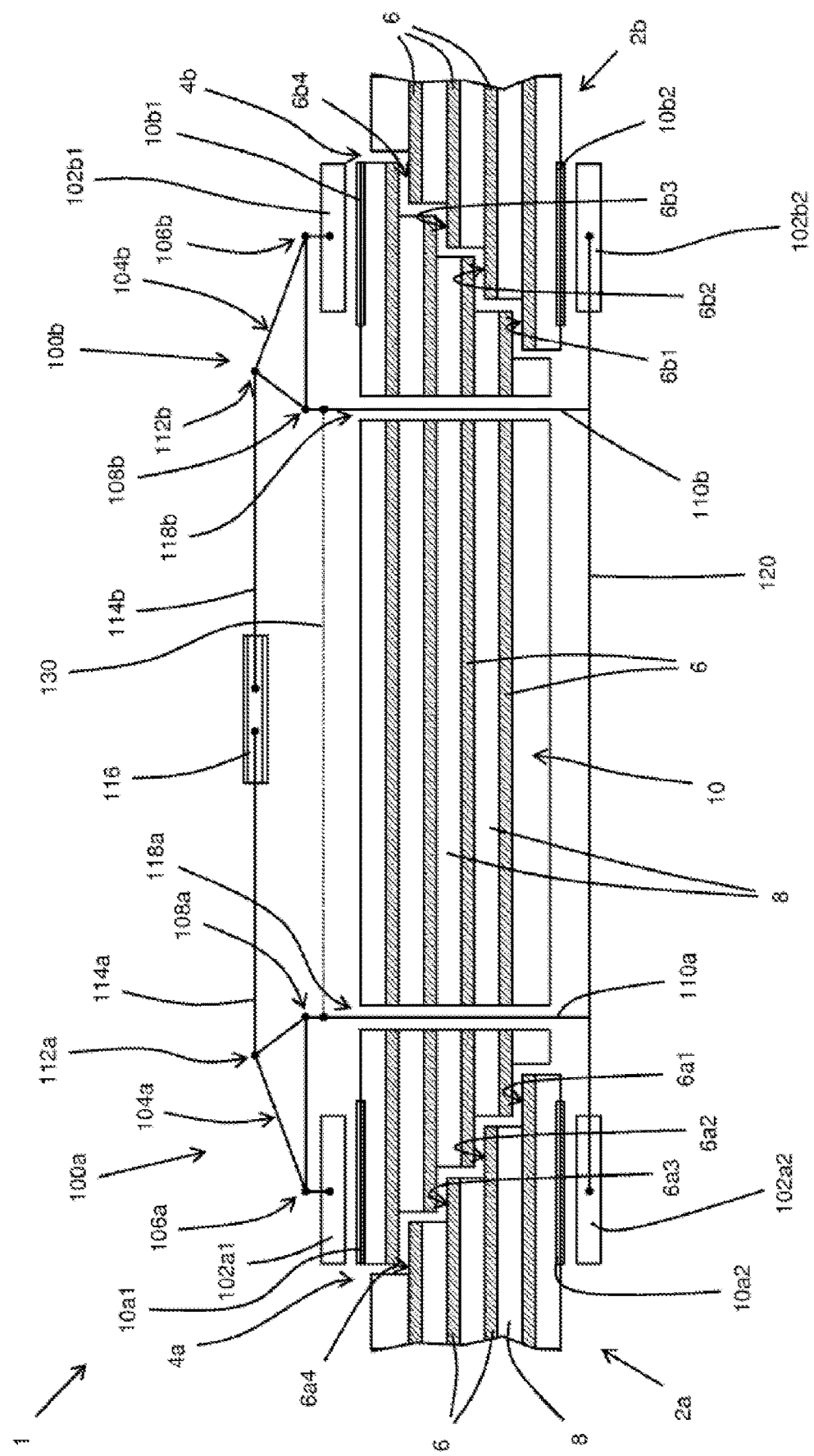
FIG. 1 is schematic side view of a first and a second busbar which are interconnected by a first embodiment of an apparatus according to the present invention.

As it is shown in FIG. 1, a first laminated multi-phase busbar 2a and a second laminated multi-phase busbar 2b include a plurality of conducting copper layers 6, wherein alternatively aluminium layers may be provided, and insulating layers 8 which are arranged above and below as well as between the conducting layers 6. The conducting layers 6 of the first laminated multi-phase busbar 2a which may be accommodated in a first switch gear cabinet project from the insulating layers 8 and form a first lateral connecting portion 4a with first contact surfaces 6a1 to 6a4. In the same way, the conducting layers 6 of the second laminated multi-phase busbar 2b which may be accommodated in a second or the same switch gear cabinet project from the insulating layers 8 thereof, so as to form a second lateral connecting portion 4b with second contact surfaces 6b1 to 6b4.

As it can be further seen from FIGS. 1 to 5, the apparatus 1 comprises a bridging element 10 which comprises a plurality of laminated insulating layers 8 and conducting layers 6 having contact surfaces which are adapted to contact the associated contact surfaces 6a1-6a4; 6b1-6b4 of the first and second lateral connecting portions 4a, 4b of the first and second busbars 2a, 2b. To do so, the busbars 2a, 2b and the bridging element 10 may have mating steplike end sections as it shown in FIG. 1.

According to the invention, the apparatus 1 comprises a first clamping arrangement 100a; 200a; 300a with clamping plates 102a1, 102a2; 202a1, 202a2; 302a1, 302a2 which are adapted to mechanically contact and urge associated opposing first outer clamping sections 10a1, 10a2 of the first busbar 2a and the bridging element 10 towards each other, as it is shown in FIGS. 1 to 5. The apparatus 1 further comprises a second clamping arrangement 100b; 200b; 300b with clamping plates 102b1, 102b2; 202b1, 202b2; 302b1, 302b2 which are adapted to mechanically contact and urge associated opposing second outer sections 10b1, 10b2 of the second busbar 2b and the bridging element 10 towards each other.

Figure 2:
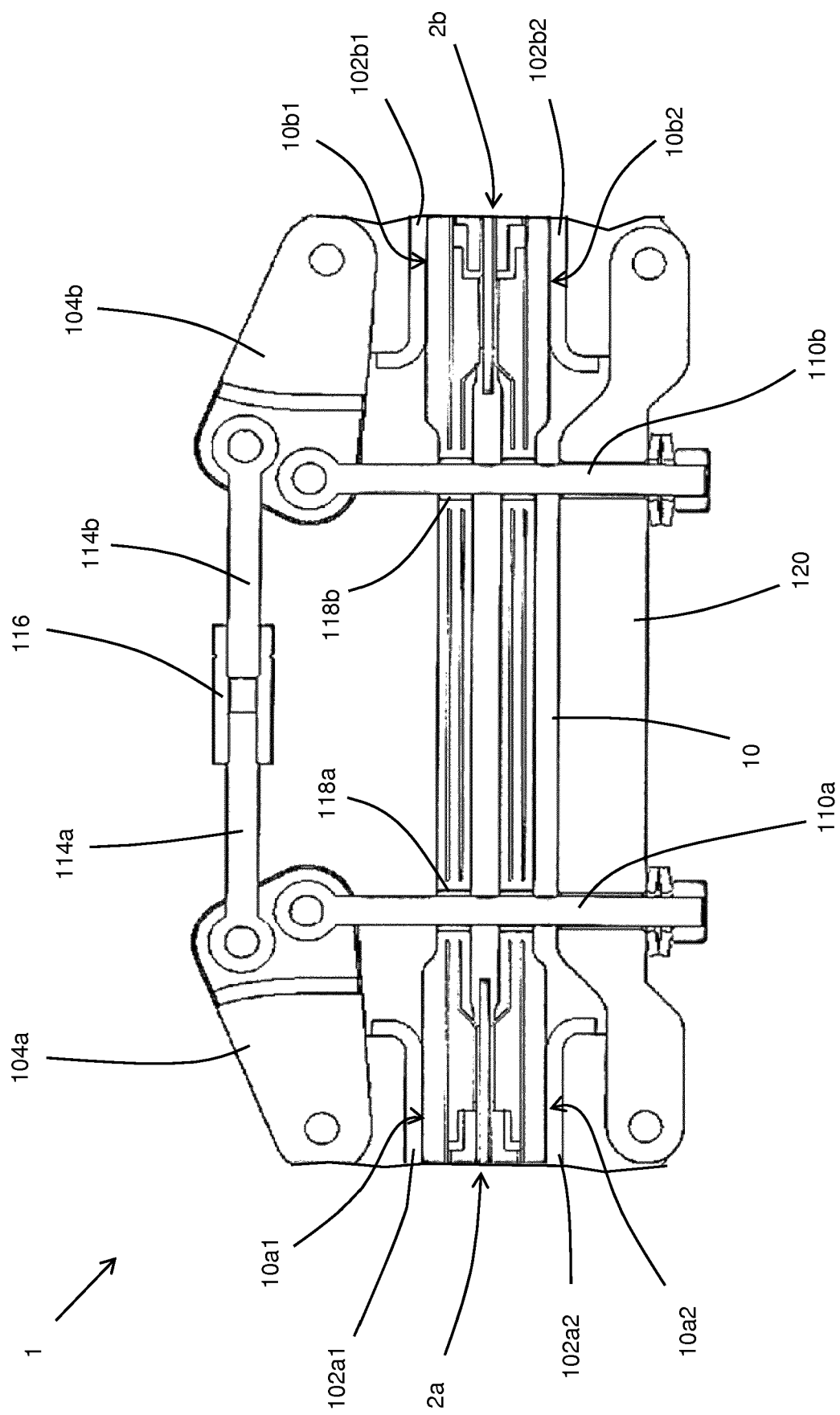
FIG. 2 is a 2-dimensional view of an apparatus according to the first embodiment of the present invention.
Figure 3:
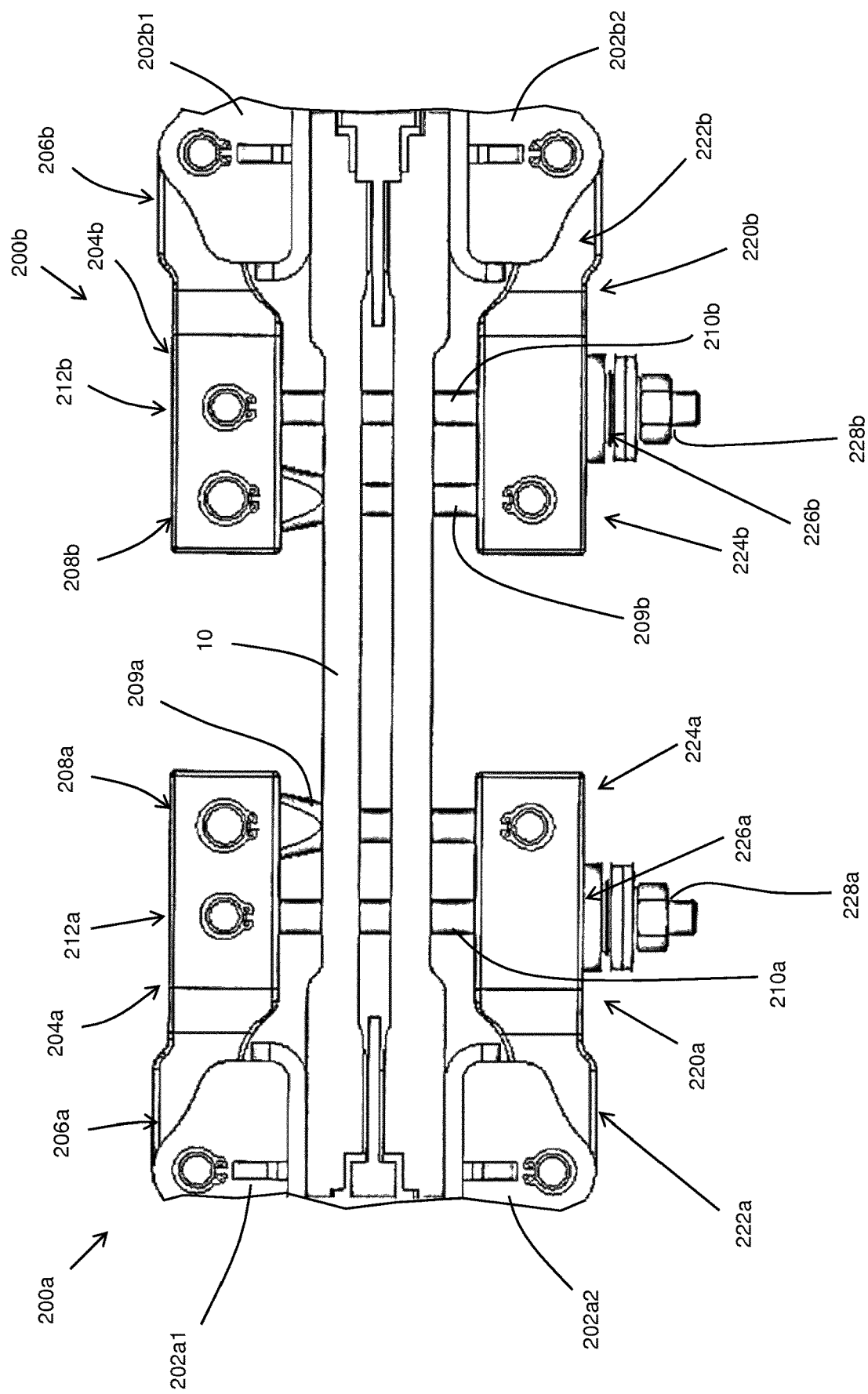
FIG. 3 is a schematic cross-sectional side view of a second embodiment of the invention.
Figure 4:
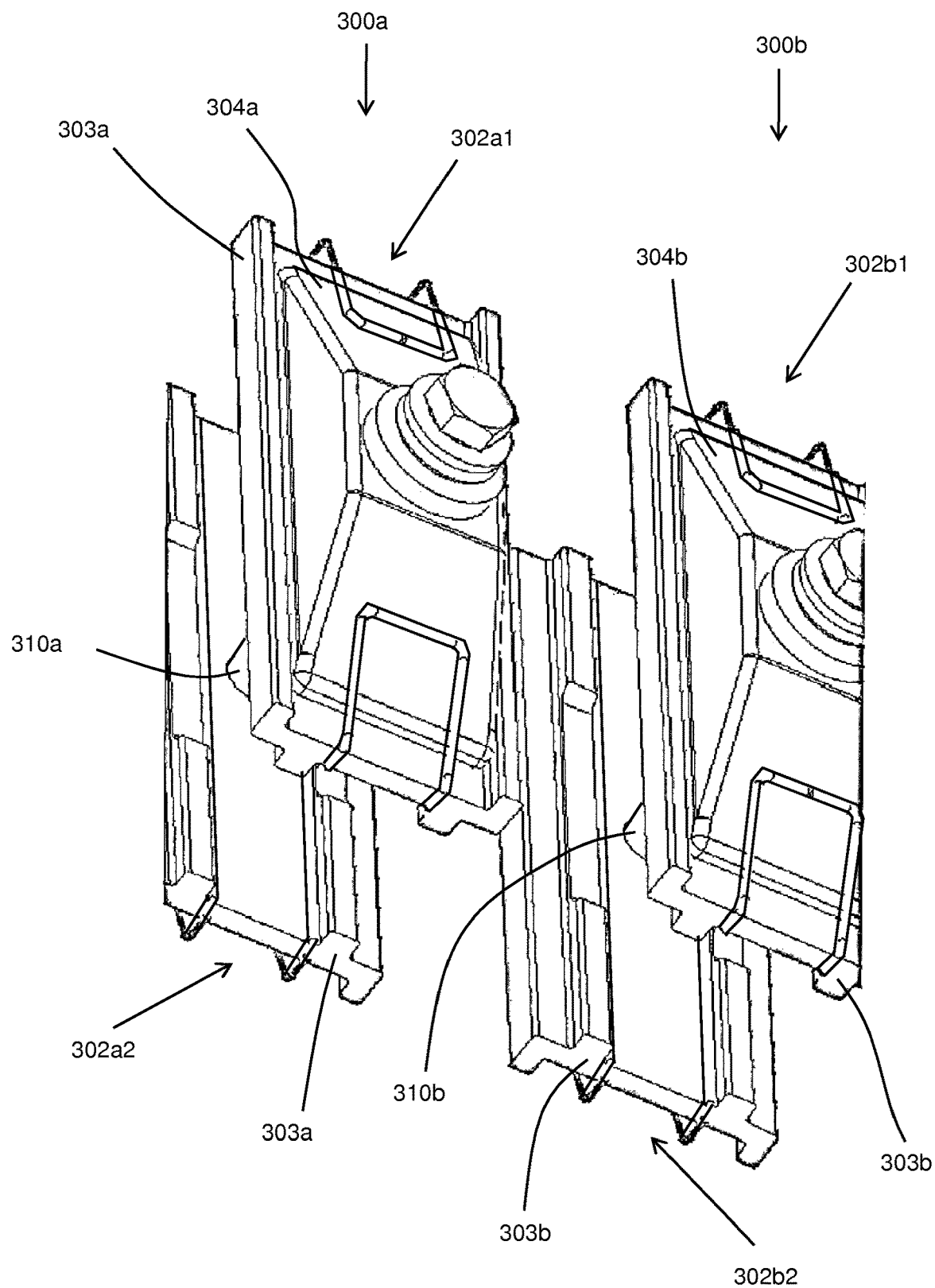
FIG. 4 is a 3-dimensional view of the clamping arrangements used in an apparatus according to a third embodiment of the invention.
Figure 5:
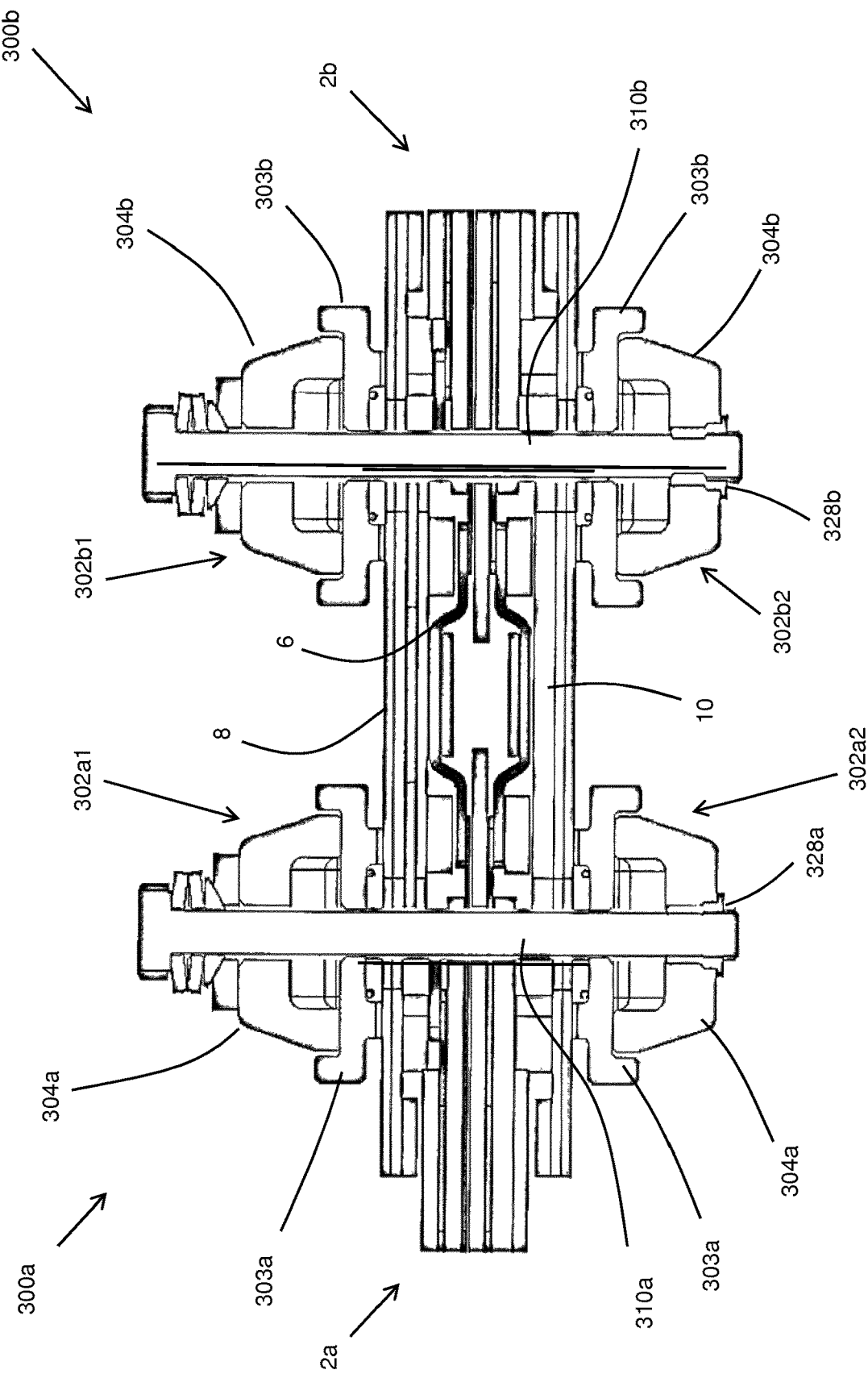
FIG. 5 is a schematic cross-sectional view of the third embodiment of the invention mounted at two laminated multi-phase busbars.

In the following description, reference numerals 100 to 130 are related to a first embodiment of the invention which is shown in FIGS. 1 and 2, reference numerals 200 to 228 concern a second embodiment which is illustrated in FIG. 3 and reference numerals 302 to 328 concern a third embodiment which is shown in FIGS. 4 and 5.

According to the first embodiment of the invention which is shown in FIGS. 1 and 2, the first and second clamping arrangement 100a, 100b comprises a pressure transfer element 104a, 104b which has a first end portion 106a, 106b to which a first clamping plate 102a1, 102b1 is pivotally connected.

The pressure transfer elements 104a, 104b comprise a second end portion 108a, 108b to which a transversal tension bolt 110a, 110b is pivotally connected and a third end portion 112a, 112b which faces away from the bridging element 10, to which a first and a second expansion bolt 114a, 114b with threaded end portions are pivotally connected. As it can be seen from FIGS. 1 and 2, the first and second pressure transfer elements 104a, 104b are arranged on a first outer side of the bridging element 10 at a distance to each other with the first end portions 106a, 106b facing away from each other.

According to another object of the present invention, the pressure transfer elements 104a, 104b preferably have a substantially triangular cross section with the first, second and third end portions 106a, 106b, 108a, 108b, 112a, 112b being tip portions of the triangular cross section.

The expansion bolts 114a, 114b which extend in a direction parallel to the outer surface of the flat bridging element 10 are coupled to each other by a turnbuckle nut 116 and can be extended and retracted by turning the turnbuckle nut 116 clock wise or anti clock wise. As it can be further seen from FIGS. 1 and 2, each of the transversal tension bolts 110a, 110b extends through a transversal opening 118a, 118b which is formed in the bridging element 10 in a direction which is perpendicular to the longitudinal axis of the third expansion bolts 114a, 114b. Each transversal tension bolt 110a, 110b is connected to a common lateral pressure beam 120 which extends across a second outer side of the bridging element 10. The pivotable coupling of the expansion bolts 114a, 114b and transversal tension bolts 110a, 110b which are preferably eye bolts, is done by pins which are illustrated in FIG. 2.

The common lateral pressure beam 120 which is made of a stiff and/or rigid material like metal, carries a fixed clamping plate 102a2, 102b2 at each of its opposing end portions which is adapted to contact an associated clamping section 10a1, 10b1 of the first and second busbar 2a, 2b that is arranged opposite to the afore-mentioned clamping sections 10a2, 10b2 of the bridging element 10.

This embodiment of the invention provides for the advantage that the through holes 118a, 118b have only to be formed in the laminated layers 4, 6 of the bridging element 10 which significantly reduces the production costs of the bus bars 2a, 2b. Moreover, the clamping forces can easily be adapted to a desired value, in order to account for different embodiments of busbars and clamping plates by simply changing the position where the pins for pivotally connecting the expansion bolts 114a, 114b and/or transversal tension bolts 110a, 110b are arranged at the pressure transfer elements 104a, 104. To do so, there may be provided a couple of different holes which are spaced apart from each other, into which the pins may be inserted, in order to change the distance of the pivot axes of the bolts relative to each other, respectively.

As it is indicated by dotted lines in FIG. 1, a reinforcing element 130 may optionally be coupled to the transversal tension bolts 110a, 110b in a releasable manner, in order to avoid that the free end portions of the bolts 110a, 110b which extend out of the transversal openings 118a, 118b, are bent away from each other upon expanding the expansion bolts 114a, 114b. The reinforcing element may also be adjustable in length by means of a turnbuckle nut as described herein before with regard to the expansion bolts 114a, 114b.

Moreover, the fixed clamping plates 102a2, 102b2 may also be pivotally mounted to the common lateral pressure beam 120.

According to another object of the present invention, the transversal tension bolts 110a, 110b extend through openings formed in the common lateral pressure beam 120 in a direction which is perpendicular to the first and second outer clamping sections 10a1, 10b1 of the busbars 2a, 2b and the first and second outer clamping sections 10a2, 10b2 of the bridging element 10 as it is illustrated in FIGS. 1 and 2. In this embodiment, each of the transversal tension bolts 110a, 110b comprises a threaded end portion to which a clamping nut may be screwed after inserting the bolts 110a, 110b through the openings 118a, 118b when mounting the apparatus 1 to the busbars 2a, 2b.

According to another second embodiment of the present invention, which is shown in FIG. 3, each of the first and second clamping arrangements 200a, 200b of the apparatus 1 comprises a first pressure transfer element 204a, 204b and a second pressure element 220a, 220b which is arranged on a side opposite to the bridging element 10. The first pressure transfer element 204a, 204b comprises a first end portion 206a, 206b to which a first clamping plate 202a1, 202b1 is pivotally connected, a second end portion 208a, 208b to which a connecting rod 209a, 209b is pivotally coupled and a third middle portion 212a, 212b to which a contractible tension bolt 210a, 210b is pivotally connected. In the same way, the second pressure transfer element 220a, 220b comprises a first end portion 222a, 222b to which a second clamping plate 202a2, 202b2 is pivotally connected, a second end portion 224a, 224b to which the first connecting rod 209a is pivotally coupled and a third middle portion 226a, 226b to which the contractible tension bolt 210a, 210b is connected.

This second embodiment of the invention provides for the advantage that due to the lever-type construction of the clamping arrangement 200a, 220b the clamping pressure can be easily adjusted to a desired value. Moreover, due to the short length and direct coupling of the contractible tension bolts 210a, 210b and the connecting rods 209a, 209b to the first and second pressure transfer elements 204a, 204b and 220a, 220b, the backlash of the clamping arrangement is minimized.

According to another aspect of the invention, the connecting rod 209a of the first clamping arrangement 200a and/or the connecting rod 209b of the second clamping arrangement 200b may extend through an opening in the middle section 226a, 226b of the second pressure transfer element 220a, 220b and comprises a threaded end portion to which a clamping nut 228a, 228b may be screwed which abuts the outer surface of the second pressure transfer element 220a, 220b, respectively, which faces away from the bridging element 10. This provides for the advantage of a compact design and a further reduction of backlash.

In a third embodiment of the invention which is shown in FIGS. 4 and 5, each of the first and second clamping arrangement 300a, 300b of the apparatus 1 includes a pair of cooperating clamping plates 302a1, 302a2, 302b1, 302b2. Each clamping plate 302a1, 302a2, 302b1, 302b2 comprises an even base plate 303a, 303b for contacting an associated outer clamping section 10a1, 10a2, 10b1, 10b2, respectively, and a dome-shaped pressure transfer element 304a, 304b, the base of which abuts the even base plate 303a, 303b. As it can be seen from FIGS. 4 and 5, a through hole is formed in the bridging element 10 and/or in the first and second lateral connecting portions 4a, 4b which matches with the through holes in the even base plates 303a, 303b and the dome-shaped pressure transfer elements 304a, 304b, so as to receive an associated first and second transversal tension bolt 310a, 310b, respectively. The first and second transversal tension bolts 310a, 310b comprise a threaded end portion to which a screw nut 328a, 328b can be screwed which abuts an outer surface of the first and second dome-shaped pressure transfer elements 304a, 304b.

By rotating the first and second transversal tension bolt 310a, 310b or tightening the screw nuts 328a, 328b, the outer clamping section 10a1, 10a2, 10b1 and 10b2 can be pressed against each other with a clamping force which is evenly distributed into the associated even base plates 303a, 303b by the specific dome-shaped form of the abutting dome-shaped pressure transfer element 304a, 304b. The dome-shaped pressure transfer elements 304a, 304b may also have the shape of a truncated cone or a truncated pyramid.

According to yet another object of the present invention, a switch gear cabinet which includes a first and a second laminated multi-phase busbar 2a, 2b is wherein the busbars 2a, 2b are electrically connected by an apparatus 1 as it is described herein before.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS 1 apparatus
2a first laminated multi-phase busbar
2b second laminated multi-phase busbar
4a first lateral connecting portion
4b second lateral connecting portion
6 conducting layers of first and second busbar
6a1-6a4 first contact surfaces of conducting layers
6b1-6b4 second contact surfaces of conducting layers
8 insulating layers of first and second busbar
10 bridging element
10a1 first outer clamping section at first busbar
10a2 first outer clamping section at bridging element
10b1 second outer clamping section at second busbar
10b2 second outer clamping section at bridging element
100a first clamping arrangement of first embodiment
100b second clamping arrangement of first embodiment 102a1, 102a2, clamping plates of first clamping arrangement
102b1, 102b2, clamping plates of second clamping arrangement
104a, 104b pressure transfer element
106a, 106b first end portion of pressure transfer element
108a, 108b second end portion of pressure transfer element
110a, 110b transversal tension bolt
112a, 112b third end portion of pressure transfer element
114a, 114b expansion bolt
116 turnbuckle nut interconnecting expansion bolts
118a, 118b transversal opening
120 common lateral pressure beam
130 reinforcing element
200a first clamping arrangement of second embodiment
200b second clamping arrangement of second embodiment
202a1, 202a2, clamping plates of first clamping arrangement
202b1, 202b2, clamping plates of second clamping arrangement
204a, 204b first pressure transfer element at first and second clamping element
206a, 206b first end portion at first pressure transfer element
208a, 208b second end portion at first pressure transfer element
209a, 209b connecting rod
210a, 210b contractible tension bolt
212a, 212b third intermediate portion of first pressure transfer element
220a, 220b second pressure transfer element at first and second clamping element
222a, 222b first end portion of second pressure transfer element
224a, 224b second end portion of second pressure transfer element
226a, 226b third intermediate portion of second pressure transfer element
228a, 228b nut element for tensioning connecting rod
300a first clamping arrangement of third embodiment
300b second clamping arrangement of third embodiment
302a1, 302a2 clamping plates of first clamping arrangement
302b1, 302b2 clamping plates of second clamping arrangement
303a, 303b base plate of clamping plate
304a, 304b dome-shaped pressure transfer element
310a first transversal tension bolt
310b second transversal tension bolt
328a, 328b screw nut

What is claimed is:

1. An apparatus for electrically connecting a first laminated multi-phase busbar to a second laminated multi-phase busbar, each of the first and second laminated multi-phase busbars including a plurality of conducting layers and insulating layers which are arranged between the conducting layers and the conducting layers of the first laminated multi-phase busbar projecting from the insulating layers thereof, forming a first lateral connecting portion with first contact surfaces, and the conducting layers of the second laminated multi-phase busbar projecting from the insulating layers thereof, forming a second lateral connecting portion with second contact surfaces, the apparatus comprising:
a bridging element which includes a plurality of laminated insulating layers and conducting layers having contact surfaces which are configured to contact associated contact surfaces of the first and second lateral connecting portions of the first and second busbar;
a first clamping arrangement comprising clamping plates which are configured to mechanically contact and urge associated opposing first outer clamping sections of the first busbar and the bridging element towards each other; and
a second clamping arrangement comprising clamping plates which are configured to mechanically contact and urge associated opposing second outer clamping sections of the second busbar and the bridging element towards each other.

2. The apparatus according to claim 1, wherein each of the first and second clamping arrangements comprises a pressure transfer element having a first end portion to which a first clamping plate is pivotally connected, a second end portion to which a transversal tension bolt is pivotally connected, and a third end portion, to which an expansion bolt is pivotally connected,
wherein the first and second pressure transfer elements are arranged on a first outer side of the bridging element at a distance to each other with the first end portions facing away from each other and the expansion bolts being coupled and movable relative to each other by a turnbuckle nut, and
wherein each of the transversal tension bolts extends through a transversal opening formed in the bridging element in a direction which is perpendicular to a longitudinal axis of the third expansion bolts and is connected to a common lateral pressure beam which extends across a second outer side of the bridging element, the common lateral pressure beam carrying a fixed clamping plate at each of its opposing end portions which is configured to contact an associated outer clamping section of the first and second busbars which is arranged opposite to the outer clamping section of the bridging element.

3. The apparatus according to claim 2, wherein the fixed clamping plates are pivotally mounted to the common lateral pressure beam.

4. The apparatus according to claim 2, wherein the pressure transfer elements have a substantially triangular cross section with the first, second, and third end portions being tip portions of the triangular cross section.

5. The apparatus according to claim 2, wherein the transversal tension bolts extend through openings formed in the common lateral pressure beam in a direction which is perpendicular the first and second outer clamping sections of the first and second busbars and the first and second outer clamping sections of the bridging element.

6. The apparatus according to claim 1, wherein each of the first and second clamping arrangements comprises a first pressure transfer element and a second pressure element which is arranged on an opposite side of the bridging element,
wherein the first pressure transfer element comprises a first end portion to which a first clamping plate is pivotally connected, a second end portion to which a connecting rod is pivotally coupled, and a third intermediate portion to which a contractible tension bolt is pivotally connected, and
wherein the second pressure transfer element comprises a first end portion to which a second clamping plate is pivotally connected, a second end portion to which the connecting rod is pivotally coupled, and a third intermediate portion to which the contractible tension bolt is connected.

7. The apparatus according to claim 6, wherein the connecting rod of the first clamping arrangement and/or the connecting rod of the second clamping arrangement extends through an opening in the third intermediate portion of the second pressure transfer element and comprises a threaded end portion on which a clamping nut is receivable, the clamping nut abutting an outer surface of the second pressure transfer element facing away from the bridging element.

8. The apparatus according to claim 1, wherein each of the first and second clamping arrangements includes a pair of cooperating clamping plates each comprising an even base plate configured to contact one of the outer clamping sections, respectively, and a dome-shaped pressure transfer element abutting the even base plate, with a central through hole formed therein, wherein the first clamping arrangement further comprises a first transversal tension bolt which extends through a through hole formed in the bridging element and/or the first lateral connecting portion and the central through holes in each of the dome-shaped pressure transfer elements, wherein the second clamping arrangement further comprises a second transversal tension bolt which extends through a further through hole formed in the bridging element and/or the second lateral connecting portion and the central through holes in each of the second dome-shaped pressure transfer elements, wherein the first and second transversal tension bolts comprise a threaded end portion which is receivable in a threaded portion which is formed in the first and second dome-shaped pressure transfer elements or in a screw nut abutting an outer surface of the first and second dome-shaped pressure transfer elements.

9. A switch gear cabinet, comprising:

a first and a second laminated multi-phase busbar, wherein the busbars are electrically connected by the apparatus according to claim 1.

* * * * *